United States Patent [19]

Ludwig et al.

[11] Patent Number: 4,592,837

[45] Date of Patent: Jun. 3, 1986

[54] APPARATUS FOR THE FILTERING OF SOLIDS-CONTAINING LIQUIDS

[75] Inventors: Gerhard Ludwig, Isernhagen; Jozsef Simon, Laatzen; Eckhard Zörkendörfer, Hanover; Günther Gappa, Gelsenkirchen; Knut Vaupel; Jürgen Klein, both of Essen, all of Fed. Rep. of Germany

[73] Assignee: Bergwerksverband GmbH, Essen, Fed. Rep. of Germany

[21] Appl. No.: 587,933

[22] Filed: Mar. 9, 1984

[30] Foreign Application Priority Data

Mar. 9, 1983 [DE] Fed. Rep. of Germany ....... 3308287

[51] Int. Cl.⁴ ............................................. B01D 23/10
[52] U.S. Cl. .................................... 210/189; 210/268; 210/389
[58] Field of Search ............... 210/786, 788, 792, 188, 210/512.1, 538, 539, 189, 268, 388, 389

[56] References Cited

U.S. PATENT DOCUMENTS

| 4,001,116 | 1/1977 | Selcukoglu | 210/539 X |
| 4,060,484 | 11/1977 | Austin et al. | 210/786 |
| 4,126,546 | 11/1978 | Hjelmner et al. | 210/786 X |
| 4,202,778 | 5/1980 | Middelbeek | 210/539 X |
| 4,246,102 | 1/1981 | Hjelmner et al. | 210/786 X |

FOREIGN PATENT DOCUMENTS

| 668030 | 11/1938 | Fed. Rep. of Germany . |
| 945362 | 7/1956 | Fed. Rep. of Germany . |
| 2650051 | 12/1977 | Fed. Rep. of Germany . |
| 2434968 | 3/1978 | Fed. Rep. of Germany . |
| 2753064 | 6/1978 | Fed. Rep. of Germany . |
| 2708340 | 4/1981 | Fed. Rep. of Germany . |
| 2104861 | 6/1981 | Fed. Rep. of Germany . |

Primary Examiner—Thomas Wyse
Attorney, Agent, or Firm—Karl F. Ross; Herbert Dubno

[57] ABSTRACT

Solids from a liquid containing heavy metals are filtered by first degassing the solids-laden liquid and then subjecting the degassed liquid to sedimentation to remove large particles and subsequently intermediate size particles. The suspension of fine particles is then passed in counterflow to a moving bed of granulate, especially black peat, to which the particles tend to adhere externally and internally. Clear liquid is removed from the top of the moving bed and the granulate is washed after being withdrawn from the bottom of the bed and is recycled to the moving bed.

6 Claims, 4 Drawing Figures

APPARATUS FOR THE FILTERING OF SOLIDS-CONTAINING LIQUIDS

FIELD OF THE INVENTION

Our present invention relates to a method of and to an apparatus for the filtering of solids-containing liquids and, more particularly, to the improved removal of solid particulates from a liquid state.

BACKGROUND OF THE INVENTION

For the cleaning of chemical-process and municipal or other waste water containing heavy metals as well as solids and dissolved impurities, it is generally impractical, if not impossible, to eliminate all of the impurities which may be considered to be environmental contaminants in a single stage. Generally speaking, the removal of suspended solids from the liquid leaves a liquid phase which can be treated without significant difficulty and also makes possible the recovery of valuable components from the separated solid phase.

The solids can be separated from liquids in which they are entrained by sedimentation (settling of solids) and decantation of the supernatant liquid or by holding back the solids while permitting the liquid to pass on a sieve or other filtering surface. Reference to a filtering apparatus, therefore, will mean an apparatus having a surface upon which solids can be collected or on which solids can be held back while the liquid is permitted to pass. Sedimentation takes a disadvantageously long time and is seldom quantitative especially where the particle size distribution in the liquid phase is wide. However, filtration methods for low solids loading of a liquid, e.g. a solids loading below 1% by weight, are comparatively expensive since a sufficient filtration rate requires large filter surfaces and large filter surfaces imply high capital and process costs. The latter are, of course, a result of the need to maintain a certain pressure differential across the solids-collecting surface during the vibration process, the need to remove the filter cake from time to time and the need to backwash the filter.

Both sedimentation and filtration, therefore, are discontinuous processes which must be interrupted from time to time to allow a cleaning operation to be carried out and during which the liquid to be cleaned must be passed through a further similar apparatus in parallel to the one being cleaned, thereby further increasing the capital cost.

OBJECTS OF THE INVENTION

It is the principal object of the present invention to provide a method of filtering solids-laden liquids whereby the aforedescribed disadvantages are obviated.

A more specific object of this invention is to provide a method for the filtering of a liquid containing solids particles which permits continuous operation with a comparatively high degree of separation and yet relatively low cost and which permits more economical and efficient regeneration and reuse of the filter or filter materials.

Still another object of this invention is to provide an improved method of filtering solids, which generally can be in a particle size range of about 1 to 50 microns, i.e. relatively fine solids, from a liquid.

It is also an object of this invention to provide an improved method of filtering solids from a liquid which enables recovery of the solids in a form facilitating recovery of valuable components thereof, especially in the heavy metal industrial, process and waste water treatment field.

It is also an object of this invention to provide an apparatus for carrying out the improved process.

SUMMARY OF THE INVENTION

These objects and others which will become apparent hereinafter are attained, in accordance with the invention, in a method for filtering solids-containing or turbid liquids wherein the suspension is subjected to a degassing by introducing it tangentially into a conical inlet funnel opening into a sedimentation apparatus in which large solid particles are separated from the suspension. Thereafter, a supernatant is fed to a distributor and discharge cone of a mobile layer reactor simultaneously serving as a separator for particles of an intermediate size. The fine-particle suspension from the inlet cone passes in counterflow to the traveling layer of a granulated porous solid (granulate) and the granulate to which the fine particles adhere is continuously withdrawn from the traveling layer and in a precleaning step, for removal of a portion of the fine material after the granulate is pulsatingly subjected to a flushing operation. For regeneration, the residual fine material from the granulate is washed thereafter and the cleaned granulate is recycled to the traveling layer.

According to the process of the invention, therefore, after settling out of the larger particles the suspension, containing the finely divided solids in the 1 to 50 microns particle size range, is thus passed in counterflow continuously to a granulate to which these particles have an affinity and are likely to adhere, the solid-free liquid being drawn off at one end of the traveling-bed reactor while the granulate nurtured by surface adhesion of the particles is drawn off at the other end, this filtering process being continuous. The subsequent preflushing and fine washing of the granulate can be intermittent without interruption of the filtering process as long as a continuous supply of the generated granulate to the travel bed reactor is assured.

The granulate, being a porous material, captures the fine particles of the suspension partly by adhesion to the external surfaces and partly within the pores or on internal surfaces thereof.

The filtration process of the invention, even with comparatively large flow of suspension with respect to the granulate volume or weight can provide an unobjectionable and practically complete continuous filtration and simultaneously a maximum loading of the porous granulate with the fine particles which are to be filtered out. The capture of the fine solids on the porous granulates can be effected by the counterflow of the suspension and the granulate in a simple cylindrical filtration apparatus in which the granulate flows downwardly, i.e. by gravity, while the liquid flows upwardly. In other words, the traveling bed passes by the natural weight of the granulate through the liquid phase.

Because the capture of the fine solids by the granulate is a mechanical filtering effect the adherent solid particles can be removed from the granulate, simply and mechanically to permit the granulate to be recycled to the filtration process. The cleaned granulate is fed to the granulate bed continuously and the charged granulate is removed continuously from the bed. Losses by frictional degradation of the granulate can be replaced by adding fresh granulate, i.e. either new granulates or granulate which has been cleaned and is drawn from a reserve.

The traveling bed filtration process of the invention thus utilizes granulated porous solids which have hitherto been utilized only for adsorption processes working with practically solids-free liquids phases, for filtration purposes. The regeneration and reuse of the granulate, however, is far more efficient than that which obtains with many adsorption processes.

Basically the charged granulate removed from the filtration apparatus is regenerated by flushing and washing operations. Preferably the liquid used for this purpose can be the clarified liquid obtained from the filtration process, i.e. the treated waste water which can be discharged. The cleaning of the charged granulate by washing is most effective when charged granulate is entrained in a pulsating liquid stream or in a three-phase stream to the washing unit so that a portion of the adherent solids particles are removed by the pulsating shear forces generated during the travel of the particles to the washing unit, i.e. in an entrainment washing or feed washing operation.

Uniform filtration in the granulate bed is ensured by the prior degasification of the suspension and the preremoval of the relatively large particles as well as especially large or particularly heavy particles. It is for this purpose that the traveling bed filtration is preceded by the degasification step and the preliminary sedimentation. The degasification before the suspension enters the filter eliminates any tendency toward gas evolution in the filter which might break up the uniformity of the traveling bed and thus allows increased traveling bed speeds and thus smaller apparatus volumes for a given flow rate.

The clarified liquid, before reuse for the washing step and/or discharge is subjected downstream of the clear-fluid outlet to a continuous operation for the removal of dissolved metal, i.e. to an ion-exchange treatment.

We have found that highly effective results are obtained when the porous granulates consist of or include peat, especially black peat or peat mixtures. The black peat which we prefer is a highly decomposed, high moor peat which is treated for improved permeability. Peats which have not been treated may not all be as effective because such untreated materials tend to have minimum water permeability and to readily block the flow therethrough. Hence the peat should be subjected to thermal or other treatments which may result in granulation and, indeed the peat granulate can be prepared in the same manner as peat granules for garden application. These methods may include freeze granulation. The peat can be destructively distilled further before granulation if desired.

A suitable method of preparing the granulate, and indeed another feature of the invention involving the preparation of the granulate, can be the following: Initially the peat is milled and frozen. The freezing step appears to enlarge the capillaries and modify the colloids therein which nevertheless retain their adhesive character. The peat is then ground and homogenized. The powder is then granulated on an inclined rotation granulation or pelletizing table while water is spread onto the table to form a crude granulate in the form of plates with a water content of about 73%. These plates are then dried at a temperature of about 80° C. to a water content of about 20%, thereby creating relatively hard and compression- and wear-resistant particles. Undersize and oversize particles are separated by sieving and the granulate is then wet with hot water to drive off air and swell the granulate. The resulting granulate humidity is measured by the Post Humostat at approximately H8. The granulate before swelling has a particle size of 1 to 2 mm and the peat used in the example below, following this method, may be peat derived from the Neudorf-Platendorf moors.

According to another aspect of the invention, the apparatus for carrying out the method comprises a traveling-bed reactor with an upper inlet for the fresh granulate, an outlet in a lower portion of the outlet funnel for charged granulate, an upwardly converging feed-cone with a liquid permeable conical shell disposed within the outlet funnel and serving as a feeder for the liquid to be filtered and an overflow at the upper part of the reactor for the clear liquid. The reactor is preferably a cylindrical vessel which is oriented in an upright position.

Such an apparatus has been used heretofore, to the best of our knowledge, exclusively for the adsorptive removal of materials contained in a liquid utilizing active carbon granulate which, although it may be used in the system of the present invention, need not be utilized since the peat granulate previously described, which cannot be considered an active carbon, is preferably used. In these prior art systems the adsorption medium is utilized to treat a solids-free liquid (see the German patent publications 24 36 792, 24 37 745 and 25 09 432).

For separating the fine solids from the granulate, downstream of the granulate outlet of the traveling-bed reactor, according to the invention in the direction of recirculating of the granulate, a sieve trough is provided with nozzles entrained upon the sieve trough and through which the washing or flooding liquid is directed to the granulate.

The adhesion of the solids particles from the suspension on the granulate is a function of the speed at which the suspension flows relative to the granulate in the filtration appratus. However, when the granulate is spread on a sieve trough and can be subjected to vibration as is the preferred case while traveling along this trough, the droplets from the washing spray or nozzles can readily dislodge much of the solid particles in spite of the strong adhesion. Thus the removal of the solids particles from the granulates is facilitated on the vibratory sieve trough. Indeed, the solids-charged granulate can be subjected to a prewashing and preseparation of the solids from the granules by entraining them in a three-phase conveyor substantially vertically and then perpendicularly onto the washing trough.

When the conveying pipe for this purpose has a relatively large diameter and transports the granulate in a pulsating manner, the pulsation and transport phenomena set up their shear forces in the liquid which tend to release the adherent fine particles and tend to stress the granules themselves only slightly.

Indeed, the upright pipe rising from the lower end of the traveling-bed reactor to the washing sieve thereabove serves to equalize the level differences of the water column in the traveling-bed reactor so that the cleaned granulate can be returned directly to the traveling bed reactor or via an intermediate storage or buffer vessel.

This has been found to minimize friction losses and degradation losses of the granulate.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
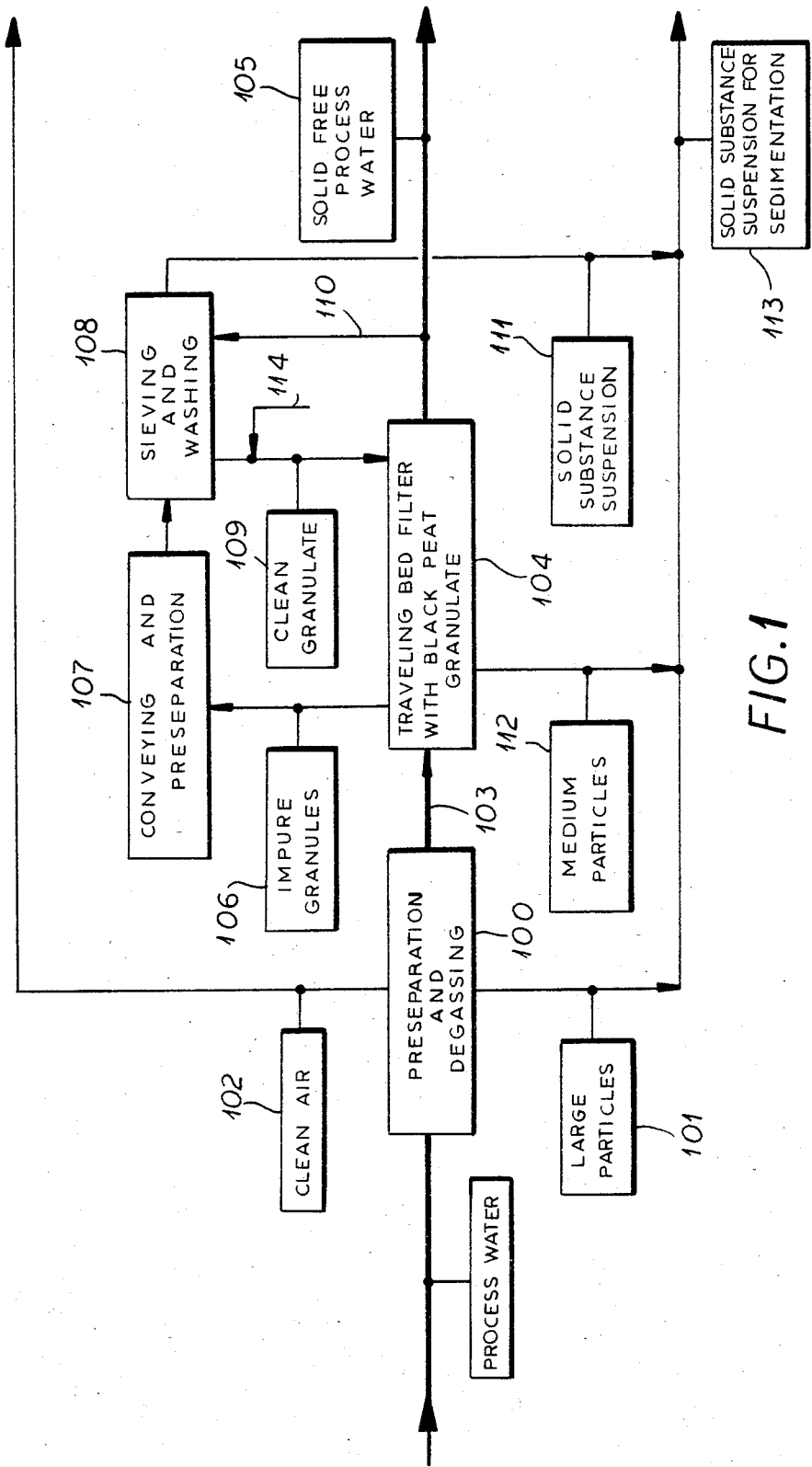
FIG. 1 is a flow diagram in block form illustrating the process of the present invention.

As can be seen from FIG. 1, a filtration process utilized for the cleaning of industrial waste water, hereinafter referred to as process water, can be effected in a number of steps which have been represented diagrammatically by blocks in FIG. 1.

In the first step 100, the waste water is subjected to a presettling of large particles 101 and a degasification to release entrained air as represented at 102 before the suspension-containing fine particles are fed at 103 to a traveling-bed filter 104. The solids-free process water is recovered at 105.

As is also apparent from this process flow diagram, the granulate is recirculated in a counterflow to the water which is treated and the contaminated granulate is thus fed at 106 to a conveying stage 107 in which at least a preliminary loosening of the adhesion of solids particles to the granulate is effected. The granulate is then delivered to the washing stage 108 which can involve the use of a travel sieve or sieve trough, preferably with vibration, as will be described, with the cleaned granulate being returned at 109 to the filtering stage 104. Clear process water at 110 is used for washing the granulate and the resulting suspension 111 of the solids is combined with the large particle fraction 101 and solids 112 recovered from the distribution and discharge cone of the filter and can be subjected as indicated at 113 to sedimentation or other treatments.

The loss of granulate is made up by the addition of clean or fresh granulate at 114.

Figure 2:
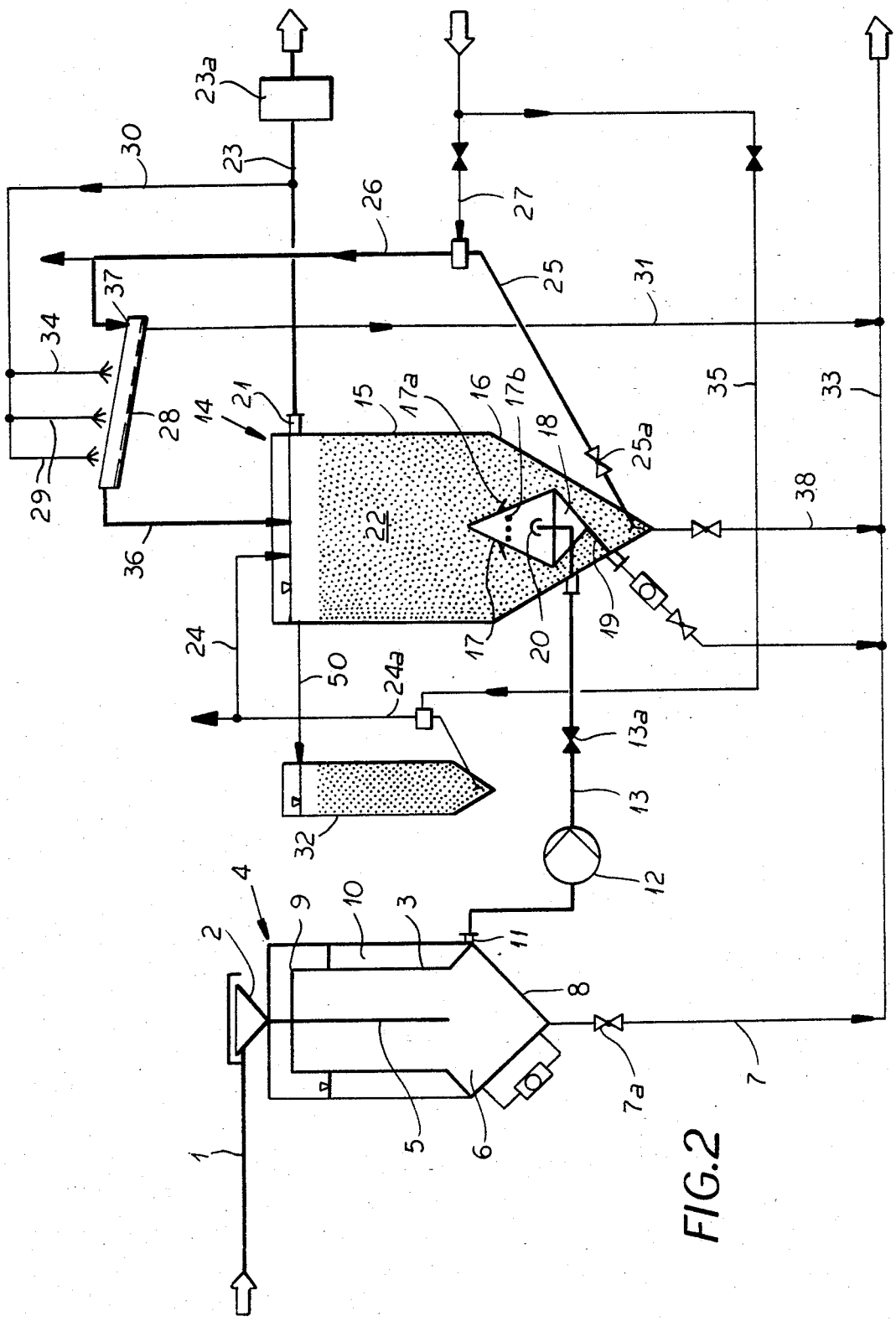
FIG. 2 is a flow diagram of a filtration plant in accordance with the invention.

Referring now to the equipment which is used to carry out these steps, it can be seen from FIG. 2 that the suspension inlet 1 opens tangentially into an inlet funnel 2 and is thereby degassed with the formation of a rotary film on the internal conical surface of the funnel 2. The released air is vented through the top of the funnel.

The suspension then passes downwardly through a vertical central dip tube 5 extending to a lower portion of a sedimentation vessel 3 in the sedimentation unit 4. The dip tube terminates just above a cross sectional enlargement 6 which forms the sedimentation zone below the tube 5 and in which sedimented or settled solids particles can collect. These particles generally have a particle size greater than 250 microns. The lower portion of this sedimentation zone is a conical funnel at 8 and serves as a discharge funnel through which the sediment can be discharged to a common line 33 collecting other wastes. The line connecting the discharge funnel 8 with the common line 33 has been represented at 7 and is provided with a valve 7a.

The upper end 9 of the vessel 3 is formed as a weir over which the liquid flows into an annular compartment 10 forming a reservoir connected by an outlet 11 to a centrifugal pump 12 which feeds, via a pressure line 13, and control and check valves represented generally at 13a, the suspension to a traveling bed or circulating bed reactor 14.

The reactor 14 comprises an essentially cylindrical vessel 15 having a conical discharge funnel or bottom 16 with apex angle of about 60°. In the upper third of this discharge funnel 16 and axially therewith there is provided an upwardly directed distributor and discharge cone 17 which can have an apex angle also of about 60° and which converges upwardly while being perforated or otherwise permeable to allow the upward flow of liquid.

This body is in the form of a metal hollow cone and includes a downwardly convergent conical base 18 which forms a sedimentation compartment for the suspension fed by the pump 12 to this distribution and discharge cone 17. The sedimentation compartment 18 forms a separator for particles of an intermediate size, i.e. in the particle size range of 50 microns to 250 microns. The solids in this particle size range can be carried off by an outlet 19 and delivered via a check valve to the common line 33 previously mentioned. The particle removal from the cone 17 can be discontinuous.

The pressure line 13 extends into the cone 17 and terminates in an upwardly directed outlet trained upon a downwardly concave dome 20 which reflects the stream first downwardly to assist in sedimentation.

As indicated previously, the upwardly convergent portion of the cone 17 is perforated, preferably in horizontal rows and these perforations can be provided with downwardly inclined baffles, if desired, so that although the cone 17 is liquid permeable the granulate cannot enter. Such baffles have been represented diagrammatically at 17a above the row of perforations 17b in FIG. 2.

The hole density and size, the apex angle of the cone 17, the relationship of this distributor or the discharge funnel 16 and the dimensions of the gap between them are selected to ensure a uniform distribution of the suspension over the entire filter cross section and to ensure the uniform downward movement of discharge of the granulate, i.e. the traveling bed.

The vessel 15 is formed with an outlet 21 and its upper end above the granulate layer which is obtained in this vessel and which represents a clear-liquid outlet from which the filtrate can be discharged as represented at 23.

The traveling bed reactor 14 is supplied with granulate via an inlet 24 from a vessel 32 which can contain new granulate or washed granulate and which can be a buffer or storage vessel. If washed granulate is to be stored in the buffer vessel 32, a portion of the recycled granulate from line 36 can be branched to it.

The granulate is delivered via line 24 by air lift in a three-phase system. A line 50 connects the vessels 15 and 32 above the bed 22 of granulate to ensure hydrostatic balance.

For the pneumatic displacement of the granulate, air can be fed via a line 35 to the base of the upright duct 24a.

Below the sedimentation compartment 18 an upwardly inclined outlet 25 opens into the bottom of the discharge funnel 16 and can be provided with a valve 25a for discharge of the granulate laden with the adherent solids. This pipe 25 opens at the base of a vertical conveyor tube 26 forming part of an air-lift pump to which compressed air is fed via a line 27. As a consequence, the slurry of the granulate rising in the conveyor pipe 26 and entrained by air is a three-phase mixture. The density of this three-phase mixture is selected such that it can be carried a sufficient height above the liquid level in the vessel 15. To generate a pulsating displacement which, in turn, promotes the shear effect which contributes to the loosening of the adhesion of the solids to the granulates, the conveyor pipe 26 should have a height of 1.4 meters and a diameter of 0.03 meters as is the case in the example supplied below.

Figure 3:
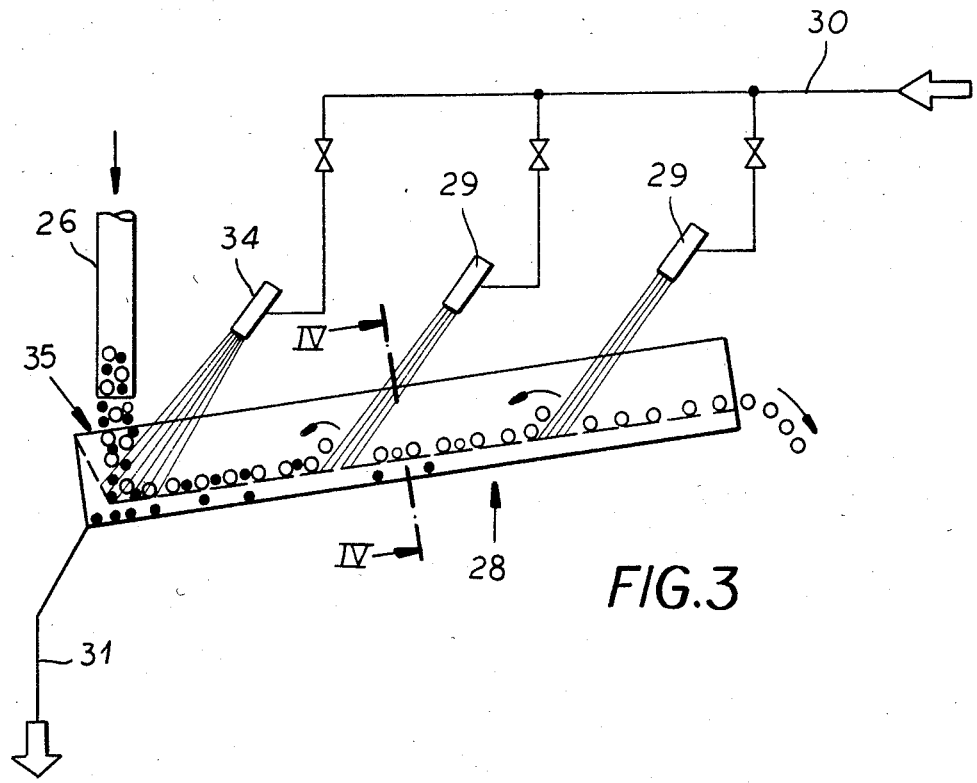
FIG. 3 is a diagrammatic partial section through a vibratory sieve for use in cleaning the granulate according to the invention.

The outlet 37 of the conveyor pipe 26 is directed downwardly above the foot of a vibratory sieve trough 28 which is inclined to the horizontal at an angle of about 12° and, as can be seen in FIG. 3, is vibrated to displace the particles upwardly against the jets of washing liquid which are directed downwardly against the upward movement of the particles.

Figure 4:
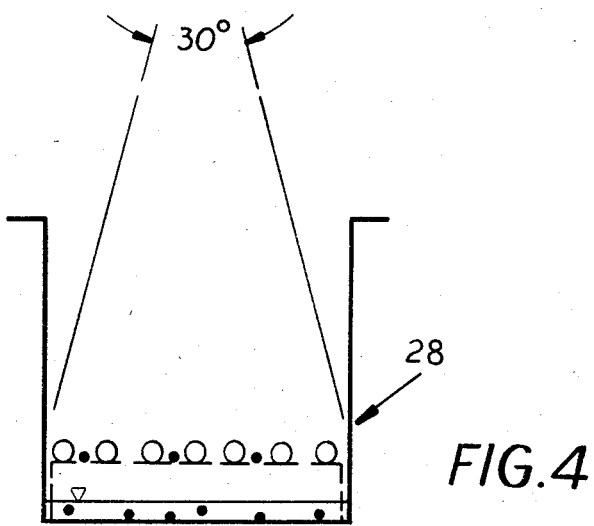
FIG. 4 is a detail view drawn to a larger scale taken along the line IV—IV of FIG. 3.

An advantageous construction of this vibratory sieve has a sieve length of 0.5 meters and a breadth of the sieve of 0.05 meters. Several rows of washing nozzles 29 can be provided entrained upon the particles or the scrubbing liquid can be directed from a single row of nozzles as shown in FIG. 3 with the discharge having a conical pattern with an angle of substantially 30° as indicated in FIG. 4. The nozzles 29 are provided at the end of a washing liquid line 30 and the washing liquid line can be branched as is apparent from FIG. 2 from the clear liquid line 23.

The cleaned granulate passes over the upper end of sieve 28 and is returned to the moving bed as represented by the line 36.

The clear liquid from line 23 is subjected, if desired, to further treatment, i.e. in a traveling bed reactor to recover dissolved metal ion therefrom, e.g. by an ion exchange process or such further processing being represented at 23a. The solids-laden liquid from the discharge funnel 8, the sedimentation compartment 18 and the vibratory sieve 28 (line 31) and even from the reactor 15 (line 38) are carried by the common line 33 to a sedimentation basin from which clarifier liquid can be decanted and recycled to the process. The settled solids can be treated to recover valuable components therefrom. In this manner only small quantities of liquid with high solids concentration may be subjected to sedimentation.

In the detail shown in FIG. 3 of the vibration sieve, it will be apparent that two fan-shaped sprays from washing nozzles 29 are utilized, these sprays being delivered at an angle of about 45° to the plane of the sieve 28 and can each carry 20% by volume of the scrubbing liquid whereas a conical screwing jet is delivered by the additional nozzle 34, the apex at the same angle but with about 60% of the scrubbing liquid. The latter jet is directed to the foot of the trough, i.e. substantially at the point at which the granulate is delivered thereto.

SPECIFIC EXAMPLE

Utilizing the apparatus illustrated in FIG. 2 a solids-laden, heavy metal containing process water from a storage battery manufacturing plant is treated. The construction and operating details and parameters for the individual stages are described below:

The process water at a flow rate of 0.8 m³ per hour is passed through the successive stages of the apparatus which is in the form of a pilot plant. The solids concentration in the process water at the inlet side varies from 0.2 to 1.5 grams per liter. The solids density amounts to 1.5 to 2.5 kg per liter.

During the preseparation in the sedimentation unit 4, solids particles with a particle size substantially above 250 microns are removed. The lumen diameter of the sedimentation vessel 3 is about 350 mm and the sedimentation compartment 6 has a diameter of about 600 mm while the heat of the cylindrical portion of the unit is about 750 mm. Approximately 0.1 liter of suspended solids in the fluid are here separated out per hour.

The cylindrical part of the moving bed reactor 14 has a diameter of 635 mm and the height of the bed is about 1 meter, the granulate content of the bed being about 320 liters. At the lower end of the vessel 15, 1.38 liters per hour of granulate is withdrawn and a corresponding amount of clean granulate, completed with make-up fresh granulate, is returned to the upper end of the vessel. The granulate which is removed carries 0.7 kg per liter thereof of adherent solids. The filter resistance of the filter bed 22 before it is laden with solids amounts to 0.007 bar while the maximum resistance of the granulate bed in a steady state of the cleaning process is 0.042 bar. The resistance of the filter bed can thus be utilized as a control parameter for regulating the rate of circulation of the granulate.

As previously described the solids-laden granulate is pulsatingly displaced and cleaned and can be lifted through a 1.40 meter conveyor pipe 26 with a lumen diameter of 0.03 meter with air at a pressure of 2 bar at a rate of 0.2 m³ per hour. The three-phase mixture enters with a velocity of 0.1 meters per second the vibration sieve 28. Here the granulate is washed with 107 liters per hour of wash water and 16.5 liters per hour of cleaned granulate is recovered. The operation losses are relatively small. The filtration efficiency of the cleaned granulate is close to that of fresh granulate and amounts to 99.5% with respect to the solids contained in the process water.

We claim:

1. An apparatus for filtering a solids-laden liquid comprising:
   (a) means for degassing said solids-laden liquid, said degassing means including a funnel and means for introducing said liquid tangentially into said funnel;
   (b) a sedimentation unit connected to said degassing means for sedimenting large particles from said solids-laden liquid, said funnel opening into said unit;
   (c) a cylindrical upright vessel traversed downwardly by a moving bed of porous granulate connected to said unit for upward flow therethrough of said liquid whereby fine particles from said liquid adhere to said granulate and are filtered from said liquid, said bed being provided with an upwardly converging perforated distributor and separator cone into which said liquid is fed which discharges said liquid into said bed, said cone having a sedimentation compartment provided with means for withdrawing particles of an intermediate size therefrom;
   (d) a pulsating conveyor connected to the bottom of said vessel for displacing granulate to which fine particles adhere, thereby loosening adhesion of fine particles to said granulate; and
   (e) washing means separate and spaced from said vessel receiving the granulate from said pulsating conveyor for treating said particles with a washing liquid to remove said fine particles therefrom and for recycling washed granulate to said bed.

2. The apparatus defined in claim 1 wherein said conveyor includes means for introducing a gas into an upright conveying duct to entrain a three-phase mixture of liquid and granulate to said washing means.

3. The apparatus defined in claim 2 wherein said washing means is an inclined vibratory sieve.

4. The apparatus defined in claim 3, further comprising nozzles for directing liquid onto said sieve in a direction opposite a direction of movement of said granulate therealong.

5. The apparatus defined in claim 1 wherein said washing means is an inclined vibratory sieve.

6. The apparatus defined in claim 5, further comprising nozzles for directing liquid onto said sieve in a direction opposite a direction of movement of said granulate therealong.

* * * * *